United States Patent Office 2,990,313
Patented June 27, 1961

2,990,313
BONDING OF POLYETHYLENE TEREPHTHALATE FIBRES TO RUBBER
Eric Knowles and Thomas James Meyrick, Manchester, England, assignors to Imperial Chemical Industries Limited, London, England, a corporation of Great Britain
No Drawing. Filed Mar. 3, 1958, Ser. No. 718,397
Claims priority, application Great Britain Mar. 7, 1957
4 Claims. (Cl. 154—139)

This invention relates to improvements in or relating to the bonding of polyethylene terephthalate fibres to rubber.

It has been proposed to bond polyethylene terephthalate fibres to rubber using a wide variety of adhesive systems but all of these proposals suffer from disadvantages that render them unsatisfactory for many purposes. Thus, for example, some of the proposals involve the use of organic solvent solutions and such solutions are preferably avoided in the manufacture of rubber articles, such as tyres, reinforced with polyethylene terephthalate fibres. Other proposals are based upon aqueous adhesive systems but in these cases the bond strength achieved is insufficient.

We have now found that, in the case of a particular aqueous adhesive system namely that based upon a butadiene-vinyl pyridine copolymer latex and a resorcinol-formaldehyde solution, a simple pretreatment of the polyethylene terephthalate fibres with certain polyisocyanates results in a remarkable improvement in bond strength so that the above mentioned disadvantages are obviated or minimised.

A simplified flow diagram of the process is as follows:

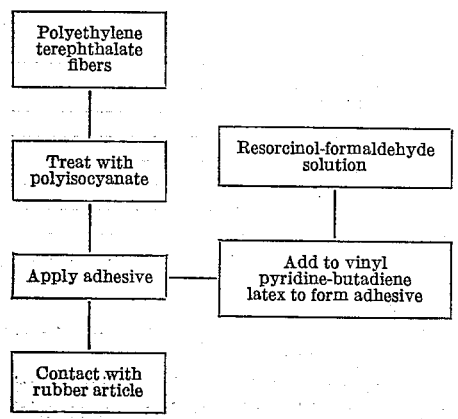

Thus according to the present invention we provide a process for the bonding of polyethylene terephthalate fibres to natural or synthetic rubber by means of an aqueous adhesive system based upon a butadiene-vinyl pyridine latex and a resorcinol-formaldehyde solution characterised in that the fibres are pretreated with 4:4′-diisocyanato diphenyl methane or 4:4′:4″-triisocyanato triphenyl methane.

The pre-treatment of the fibres with one or both of the polyisocyanates may conveniently be achieved by the use of a solution of the polyisocyanate in an organic solvent such as methylene chloride, ethylene dichloride, methyl ethyl ketone, or mixtures of these. A suitable strength of the polyisocyanate solution is from 1% to 20% by weight and a suitable amount of the polyisocyanate to be applied to the fibres, for example by dipping, licking, padding, brushing or spraying is from .05% to 5% of the weight of the fibre.

The pre-treated fibres may be used forthwith in a bonding process or they may be stored or handled in the normal course of trade for a considerable time.

The pre-treated fibres may be bonded to any natural or synthetic rubber compositions, including those based upon butadiene or chloro-butadiene polymers or copolymers with, for example, styrene, acrylonitrile or methyl methacrylate.

The bonding process may be performed in the general manner that has been described in the prior art with the use of an aqueous butadiene-vinyl pyridine latex and an aqueous resorcinol-formaldehyde solution. The manner of preparation of this adhesive system has a considerable influence on the strength of the bond, for example if caustic soda is added to the resorcinol formaldehyde composition at a dosage of 2.7% on the resorcinol the adhesive must be stored for several days before it yields satisfactory adhesion. With caustic soda at a dosage of 13.5% or 27% on the resorcinol the adhesion is high after storage periods of less than 24 hours. These latter dosages of caustic soda are higher than is generally used for applications of this type, but even so they have little effect upon the storage life of the adhesive.

The invention is illustrated but not limited by the following examples in which parts and percentages are by weight and the tyre cords used were composed of polyethylene terephthalate fibres.

EXAMPLE 1

1 part of 4:4′:4″-triisocyanato triphenyl methane is dissolved in 99 parts of methylene chloride. Heat set tyre cords were dip coated in the solution, so that on complete removal of the solvent the percentage of adhesive on the cords was 1%. The tyre cords were subjected to a second dip treatment in an aqueous adhesive based on butadiene-vinyl pyridine latex, resorcinol, formaldehyde and caustic soda, prepared 24 hours previously. The cords were dried in an oven for 10 minutes at 105° C.

The total percentage of dry adhesive deposited on the cords was found to be 8.2%.

The aqueous adhesive was prepared from compositions A and B as follows:

*Composition A*

|  | Parts |
|---|---|
| Butadiene-vinyl pyridine latex (solids content 41%) | 244 |
| Water | 61 |

*Composition B*

| | |
|---|---|
| 37% aqueous formaldehyde | 16.2 |
| Resorcinol | 11.0 |
| Water | 238 |
| Caustic soda | 3.0 |

The resorcinol formaldehyde solution (B) was allowed to stand for 60 minutes at room temperature (20° C.) before adding slowly with stirring to the butadiene-vinyl pyridine latex (A).

The treated cords were placed in contact with a natural rubber carcase compound sheeted out on a two roll mill to 2.5 mm. and reinforced at the back with frictioned 28 oz. belting fabric, to enable an adhesion test to be carried out.

The system was vulcanised in a press for 30 minutes at 141° C., to give a test piece 3 mm. thick. After 24 hours at room temperature the bond strength was determined in a Goodbrand tensile testing machine at a jaw separation speed of 4 inches per minute.

The load necessary to peel the cords from the rubber was 36.3 lb. per inch width.

The natural rubber carcase compound was as follows:

| | Parts |
|---|---|
| Smoked sheet | 100 |
| Mercaptobenzthiazole | 0.75 |
| Phenyl-β-naphthylamine | 1.0 |
| Pine tar | 2.8 |
| Zinc oxide | 50 |
| Stearic acid | 2 |
| Sulphur | 2.75 |

The process was repeated but the heat set tyre cords were not pretreated with 4:4':4''-triisocyanato triphenyl methane.

The total percentage of dry adhesive was 9%.

The load necessary to peel the cords from the rubber was 8.8 lb. per inch width.

EXAMPLE 2

The process of Example 1 was repeated, but using the following aqueous system based on a butadiene-vinyl pyridine latex, resorcinol, formaldehyde and caustic soda, that had been made 41 days previously.

Composition A

| | Parts |
|---|---|
| Butadiene-vinyl pyridine latex (solids content 41%) | 244 |
| Water | 61 |

Composition C

| | |
|---|---|
| 37% aqueous formaldehyde | 16.2 |
| Resorcinol | 11.0 |
| Water | 23.8 |
| Caustic soda | 1.5 |

The total percentage of dry adhesive deposited on the cords was 9.3%.

The load necessary to peel the cords from the rubber was 50.6 lb. per inch width.

EXAMPLE 3

Heat set tyre cords were treated with a solution containing 1 part of 4:4':4''-triisocyanato triphenyl methane and 99 parts of methylene chloride.

The treated cords were allowed to stand in normal atmospheric conditions for a period of 54 days.

After this storage period the treated cords were dip coated with the butadiene-vinyl pyridine latex, resorcinol, formaldehyde and caustic soda aqueous adhesive system of Example 1 (which had been prepared 48 hours previously), and dried in an oven for 10 minutes at 105° C.

The percentage of dry adhesive on the cords was 9.0%.

The cords were placed in contact with the natural rubber compound and vulcanised as described in Example 1.

The load necessary to peel the cords from the rubber was 42.9 lb. per inch width.

EXAMPLE 4

The process of Example 1 was repeated but using the following butadiene-vinyl pyridine latex, resorcinol, formaldehyde and caustic soda aqueous adhesive system, prepared 11 days previously.

Composition A

| | Parts |
|---|---|
| 41% butadiene-vinyl pyridine latex | 244 |
| Water | 61 |

Composition D

| | |
|---|---|
| 37% aqueous formaldehyde | 16.2 |
| Resorcinol | 11.0 |
| Water | 238.0 |
| Caustic soda | 0.3 |

The composition D was allowed to stand for 6 hours at room temperature prior to adding slowly with stirring to the butadiene-vinyl pyridine latex (A). The percentage of dry adhesive on the cords was 10.5%. The cords were placed in contact with the rubber compound and vulcanised as described in Example 1.

The load necessary to peel the rubber from the cords was 29.7 lb. per inch width.

When the process of this example was repeated but using a butadiene-vinyl pyridine latex, resorcinol, formaldehyde and caustic soda aqueous adhesive system that had been prepared only 24 hours prior to use. The percentage dry adhesive on the cords was 7%, the tyre cords were placed in contact with the rubber compound and vulcanised. The load necessary to peel the rubber from the cords was only 14 lb. per inch width.

EXAMPLE 5

The process of Example 1 was carried out, but the natural rubber compound was replaced by the following compounded polychloroprene rubber:

| | Parts |
|---|---|
| Neoprene GN | 100 |
| Magnesium oxide | 4 |
| Stearic acid | 2.5 |
| Tricresyl phosphate | 2.5 |
| Carbon black | 36 |
| Zinc oxide | 5 |

The percentage of dry adhesive on the cords was 8.2%.

The cords were placed in contact with the rubber and vulcanised in the press for 45 minutes at 153° C. The load necessary to peel the cords from the rubber was 22 lb. per inch width.

A similar process was carried out, but with no initial priming of the tyre cords with 4:4':4''-triisocyanato triphenyl methane.

The load necessary to peel the cords from the rubber was 10 lb. per inch width.

EXAMPLE 6

The process of Example 1 was carried out but replacing the natural rubber compound with a compounded copolymer of butadiene and styrene (GR-S).

| | Parts |
|---|---|
| Butadiene styrene copolymer | 100 |
| Mercaptobenzthiazole | 1.5 |
| Nonox B (antioxidant) | 1.0 |
| Zinc oxide | 5 |
| Stearic acid | 3 |
| Pine tar | 2.5 |
| Medium processing channel black | 50 |
| Sulphur | 2.0 |

The percentage of dry adhesive on the cords was 8%. The cords were placed in contact with the rubber and vulcanised for 45 minutes at 141° C.

The load necessary to peel the cords from the rubber was 29.7 lb. per inch width.

The process was repeated but with no initial priming of the tyre cords with 4:4':4''-triisocyanato triphenyl methane.

The load necessary to peel the cords from the rubber was 7 lb. per inch width.

EXAMPLE 7

The process of Example 1 was carried out, but replacing the natural rubber compound with a compounded copolymer of butadiene and acrylonitrile.

| | Parts |
|---|---|
| Butadiene acrylonitrile copolymer | 100 |
| Vulcafor F (accelerator) | 1.5 |
| Nonox B (antioxidant) | 1.0 |
| Zinc oxide | 5 |
| Stearic acid | 2 |
| Medium processing channel black | 50 |
| Sulphur | 1.5 |

The percentage dry adhesive on the cords was 9.5%. The cords were placed in contact with the rubber and vulcanised for 45 minutes at 141° C.

The load necessary to peel the cords from the rubber was 53.9 lb. per inch width.

The experiment was repeated, but with no initial priming of the tyre cords with 4:4':4"-triisocyanato triphenyl methane.

The load necessary to peel the rubber from the cords was 9.3 lb. per inch width.

EXAMPLE 8

1 part of 4:4'-diisocyanato diphenyl methane was dissolved in 99 parts of methylene chloride.

Heat set tyre cords were dip coated in the solution so that on complete removal of the solvent the percentage of adhesive on the cords was 1.3%.

The tyre cords were subjected to a second dip treatment in an aqueous adhesive based on butadiene-vinyl pyridine latex, resorcinol and caustic soda, prepared 57 days previously. The cords were dried in an oven for 10 minutes at 105° C.

The total percentage of dry adhesive deposited on the cords was found to be 12.2%. The aqueous adhesive was prepared from compositions A and E as follows:

*Composition A*

| | Parts |
|---|---|
| Butadiene-vinyl pyridine latex (solids content 41%) | 244 |
| Water | 61 |

*Composition E*

| | |
|---|---|
| 37% aqueous formaldehyde | 16.2 |
| Resorcinol | 11.0 |
| Water | 238 |
| Caustic soda | 1.5 |

The cords were placed in contact with the rubber compound and vulcanised as described in Example 1.

The load to peel was found to be 33 lb. per inch width.

What we claim is:

1. Process for the bonding of polyethylene terephthalate fibres to rubber comprising first treating said fibres with a polyisocyanate selected from the group consisting of 4:4'-diisocyanato diphenyl methane and 4:4:4'-triisocyanato triphenyl methane, thereafter applying to said fibres an aqueous adhesive system based upon a butadiene-vinyl pyridine latex and a resorcinol-formaldehyde solution and then contacting thus treated fibres with said rubber.

2. Polyethylene terephthalate fibres bonded to rubber by the process of claim 1.

3. Process for the bonding of polyethylene terephthalate fibres to rubber as claimed in claim 1 wherein the pretreatment of the fibres is achieved by the use of a solution of the polyisocyanate in an organic solvent, said solution containing from 1% to 20% by weight of polyisocyanate.

4. Process for the bonding of polyethylene terephthalate fibres to rubber as claimed in claim 3 wherein the solution of polyisocyanate applied to the fibre is from 0.5% to 5% of the weight thereof.

References Cited in the file of this patent

UNITED STATES PATENTS

| | | |
|---|---|---|
| 2,415,839 | Neal | Feb. 18, 1947 |
| 2,430,479 | Pratt | Nov. 11, 1947 |
| 2,652,353 | Wilson | Sept. 15, 1953 |
| 2,653,891 | Gentle et al. | Sept. 29, 1953 |
| 2,766,164 | Salem | Oct. 9, 1956 |
| 2,930,106 | Wrotnowski | Mar. 29, 1960 |

FOREIGN PATENTS

| | | |
|---|---|---|
| 118,839 | Australia | Aug. 17, 1944 |